United States Patent
Bignolles et al.

(10) Patent No.: US 6,747,802 B2
(45) Date of Patent: Jun. 8, 2004

(54) COMPACT OPTICAL ARCHITECTURE FOR WIDE-FIELD HELMET-MOUNTED DISPLAY

(75) Inventors: Laurent Bignolles, Bordeaux (FR); Joel Baudou, St Medard en Jalles (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/142,995

(22) Filed: May 13, 2002

(65) Prior Publication Data

US 2002/0191298 A1 Dec. 19, 2002

(30) Foreign Application Priority Data

May 15, 2001 (FR) .......................................... 01 06397

(51) Int. Cl.$^7$ .............................................. G02B 27/14
(52) U.S. Cl. ........................ 359/631; 359/630; 359/633
(58) Field of Search ................... 359/630, 631, 359/633; 345/7–9

(56) References Cited

U.S. PATENT DOCUMENTS

| | | | | |
|---|---|---|---|---|
| 3,059,519 A | * | 10/1962 | Stanton | 359/482 |
| 3,923,370 A | | 12/1975 | Mostrom | 359/630 |
| RE28,847 E | * | 6/1976 | Vizenor | 359/631 |
| 5,184,250 A | * | 2/1993 | Lacroix | 359/631 |
| 5,467,480 A | | 11/1995 | Baudou et al. | 2/6.5 |
| 5,479,294 A | | 12/1995 | Darrieux et al. | 359/630 |
| 5,517,337 A | | 5/1996 | Dupin et al. | 359/13 |
| 5,581,806 A | | 12/1996 | Capdepuy et al. | 2/6.2 |
| 5,623,730 A | | 4/1997 | Baudou et al. | 2/6.2 |
| 5,646,783 A | * | 7/1997 | Banbury | 359/630 |
| 5,734,505 A | | 3/1998 | Togino et al. | 359/631 |
| 5,742,937 A | | 4/1998 | Baudou et al. | 2/6.3 |
| 6,014,769 A | | 1/2000 | Baudou et al. | 2/6.1 |
| 6,078,428 A | | 6/2000 | Rambert et al. | 359/632 |
| 6,157,471 A | | 12/2000 | Bignolles et al. | 359/15 |
| 6,158,866 A | | 12/2000 | Gulli et al. | 351/221 |
| 6,201,646 B1 | | 3/2001 | Togino et al. | 359/629 |
| 6,262,849 B1 | | 7/2001 | Potin et al. | 359/631 |
| 6,342,872 B1 | | 1/2002 | Potin et al. | 345/8 |
| 6,356,393 B1 | | 3/2002 | Potin et al. | 359/631 |

FOREIGN PATENT DOCUMENTS

| | | |
|---|---|---|
| EP | 0 531 121 | 3/1993 |
| FR | 2 269 721 | 4/1999 |
| JP | 11-125791 | 5/1999 |
| WO | WO 91/04508 | 4/1991 |
| WO | WO 01/02893 | 1/2001 |

* cited by examiner

*Primary Examiner*—Jordan M. Schwartz
*Assistant Examiner*—Jessica Stultz
(74) *Attorney, Agent, or Firm*—Oblon, Spivak, McClelland, Maier & Neustadt, P.C.

(57) ABSTRACT

A compact optical architecture for a wide-field helmet-mounted display includes a one-piece visor and optical relay to convey said the image between an image source and the visor. The visor is formed by a surface generated by revolution having an axis of revolution ($\Delta$) parallel to the ocular axis ($\Delta_{oc}$) and substantially contained in the sagittal plane of the pilot, at the level of the forehead. The optical relay includes a forehead-mounted mirror that is not planar, having an axis of revolution ($\Delta$) that is the same as the axis of revolution ($\Delta$) of the visor, its geometrical parameters being computed in such a way that the envelope of the useful beams propagated between the forehead-mounted mirror and the first beam-formation device of the optical relay upstream from the forehead-mounted mirror are substantially contained in a cylinder with a section substantially equal to the useful surface of the mirror. Such a device may find particular use with wide-field helmet-mounted display for aircraft or helicopter pilots.

9 Claims, 3 Drawing Sheets

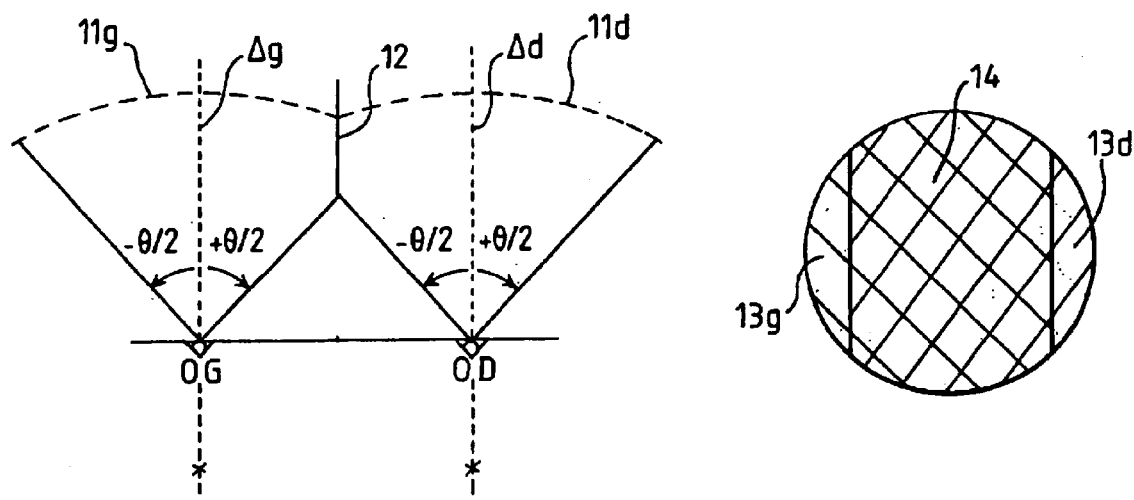
FIG.1A
Background Art
FIG.1B
Background Art
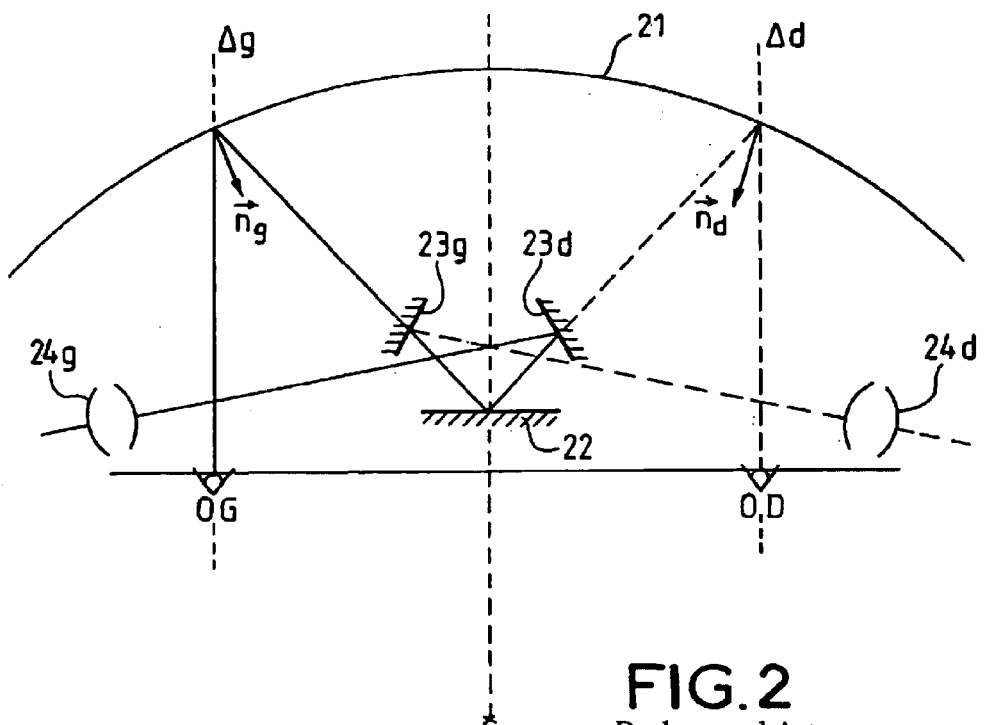
FIG.2
Background Art

COMPACT OPTICAL ARCHITECTURE FOR WIDE-FIELD HELMET-MOUNTED DISPLAY

BACKGROUND OF THE INVENTION

1. Field of the Invention

The present invention relates to a compact optical architecture for a wide-field helmet-mounted display, and can be applied more particularly to helmet-mounted display devices for aircraft or helicopter pilots.

A helmet-mounted display device enables the pilot to display flight information and/or images from sensors, for example of the light intensifier (LI) type. When coupled with a position detection system, it considerably increases the performance of the sighting system as compared with the head-up display which is fixed with respect to the axis of the aircraft.

The image presented to the pilot is projected either through a combiner (a semi-reflective piece of glass or plastic placed before the eye) or directly by means of the helmet visor. This approach has the advantage of providing a greater field of peripheral vision and therefore greater comfort of use. The helmet-mounted displays with visor projection that are currently found in the market can be used today to display fields in the range of 40° (total field) on visors consisting of two spherical half-visors.

2. Description of the Prior Art

A need is now arising for a wider field (60° to 80°) in order to give the pilot information in his peripheral field. This information makes it possible to carry out low-altitude, high-speed flights under improved conditions of security. The need to display wider fields in a helmet-mounted display rules out the use of a two-part visor. Indeed, beyond a horizontal field value in the region of +/−22° (namely a 45° field) and for a standard inter-pupil distance (63 mm), the separation between the two parts of the visor no longer provides for a total overlapping between the fields seen from the left eye and the right eye. The diagrams of FIGS. 1A and 1B thus illustrate the use of a two-part visor. FIG. 1A gives a very simplified top view of a two-part visor 11g (before the left eye OG) and 11d (before the right eye OD), with respective ocular axes Δg and Δd that are parallel, separated by a separation 12, in the case of a field θ greater than 45° (for example 60°). The ocular axis is defined by the axis that passes through the center of the pupil and is perpendicular to the plane of said pupil. FIG. 1B represents the fields seen from the left eye and the right eye in the case of a configuration of the type shown in FIG. 1A. It can be seen that the field 13g viewed from the left eye and the field 13d viewed from the right eye partially overlap in a region referenced 14 in FIG. 1B. For the pilot, this entails troublesome visual effects owing to increased luminance at the center. The separation 12 can be eliminated by implementing visor elements with divergent axes. However, this method further accentuates the inconvenience due to binocular overlapping. Furthermore, for an aircraft pilot's helmet for example, the placing of a two-piece visor is not appropriate because it is a brittle structure that may break in the event of the pilot's ejection.

FIG. 2 is a simplified and partial top view of a helmet-mounted display with a one-piece visor. As can be seen in this figure, the use of a one-piece visor (referenced 21 in FIG. 2) gives rise to difficulties of technical construction because it necessitates a relatively lengthy trajectory in the open between a first deflection mirror 22 and the image-forming means, referenced 24g on the path of the left eye OG (shown in a solid line in FIG. 2) and 24d on the path of the right eye OD (in dashes). This constraint arises out of the fact that the optical beam sent out by an image source (not shown in FIG. 2) is redirected in the case of a single-piece visor on the side opposite to the eye that it is supposed to illuminate. The vectors $n_g$ and $n_d$ represent the vectors normal to the surface of the visor 21 at the points of impact of the ocular axes Δg and Δd respectively of the left eye and the right eye. It is therefore necessary to fold the optical paths (especially by means of deflection mirrors referenced 23g et 23d in FIG. 2, respectively for the left eye and right eye channels) which give rise to optical paths that are lengthier than in the case of a two-piece visor. Now this propagation of light beams over a lengthy distance in the open leads to substantial beam diameters, necessitating large-sized image-formation means, that are incompatible with the compactness-related constraints of helmet-mounted displays.

The present invention proposes a new type of optical architecture for helmet-mounted display with visor projection, enabling the field of the visor to be augmented while at the same time meeting the constraints of mass and compactness dictated by the fact that the helmet is worn on the head.

SUMMARY OF THE INVENTION

More specifically, the invention proposes a compact optical architecture for a wide-field helmet-mounted display comprising at least one image source with a given field, a single-piece visor enabling the projection to infinity of said image before an eye of a pilot wearing the helmet, at least one optical relay to convey said image between the image source and the visor, the optical relay comprising image-formation means and at least two deflection mirrors, including one forehead-mounted mirror having a given surface area, the optical architecture being characterized in that:

said visor is formed by a surface generated by revolution, of which an axis of revolution is substantially parallel to the ocular axis and substantially contained in the sagittal plane of the pilot, at the level of the forehead, the forehead-mounted mirror is not plane, having an axis of revolution that is the same as said axis of revolution of the visor, its geometrical parameters being computed in such a way that the envelope of the useful beams propagated between said forehead-mounted mirror and the first beam-formation means of the optical relay upstream from the forehead-mounted mirror are substantially contained in a cylinder with a section substantially equal to the useful surface of said mirror.

BRIEF DESCRIPTION OF THE DRAWINGS

Other advantages and features shall appear more clearly from the following description, illustrated by the appended figures of which:

FIGS. 1A et 1B, respectively show a simplified top view of a two-piece visor and the fields seen from the left eye and the right eye in the case of the use of the visor of the type shown in FIG. 1A (already described);

FIG. 2 show a simplified top view of a helmet-mounted display with single-piece visor (already described);

MORE DETAILED DESCRIPTION

In these figures, the identical elements have the same references.

Figure 3:
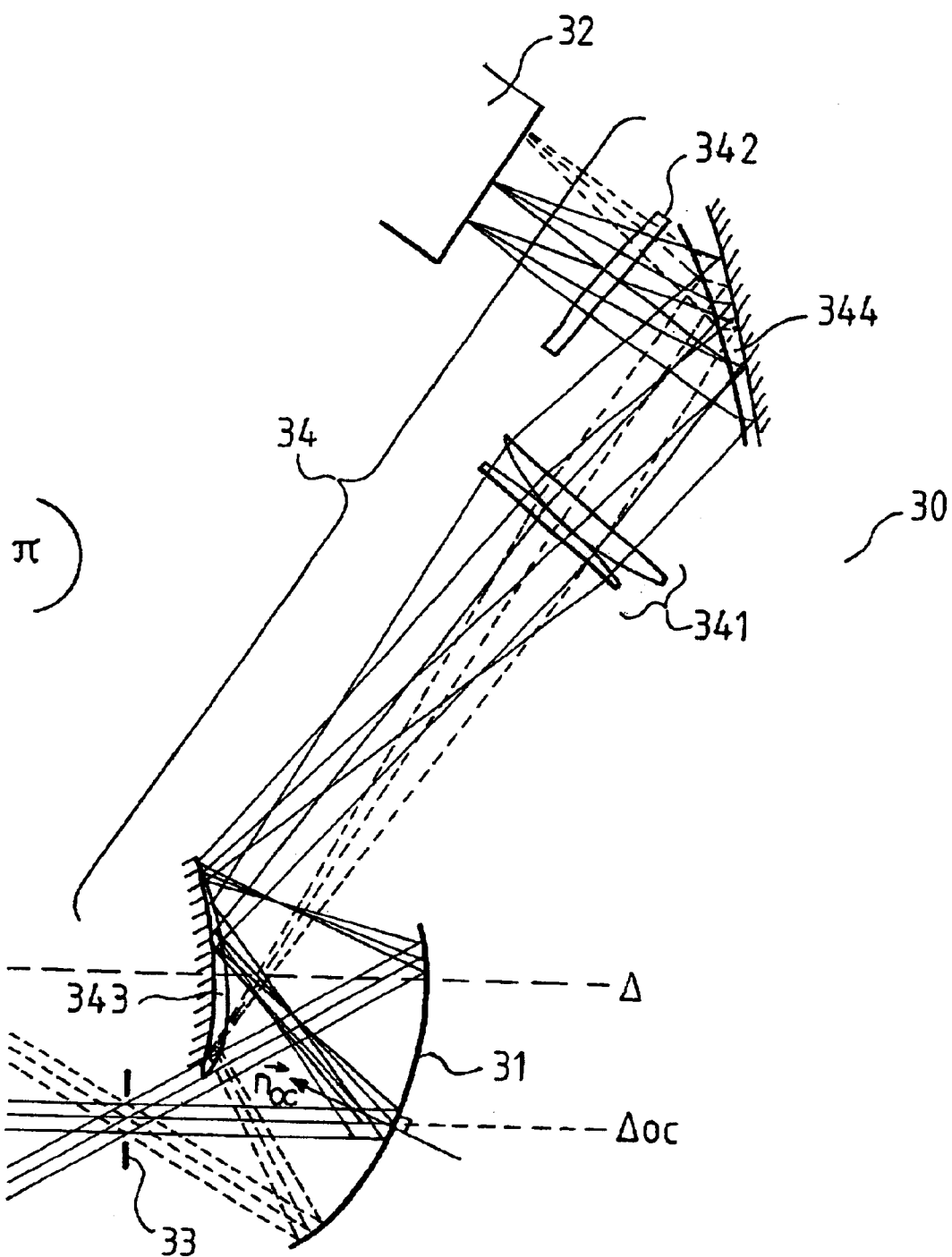
FIG. 3 is a drawing of an exemplary embodiment of an optical architecture for a helmet-mounted display according to the invention (one channel shown)

FIG. 3 is a drawing of a compact optical architecture 30 for a wide-field helmet-mounted display according to the invention. In this figure, only one channel is shown. This channel corresponds to a projection by a one-piece visor 31 of an image sent out by an image source 32 before an eye of the pilot whose pupil is referenced 33 in the FIG. 3 and whose ocular axis is referenced $\Delta_{oc}$. The optical architecture 30 also comprises an optical relay 34 used to convey the image between the image source and the visor 31, namely to form an intermediate image from the image sent out by the source 32, this intermediate image being positioned in the focal plane of the visor. The optical relay conventionally comprises image-forming means (in the example of FIG. 3, these means are reduced in a simplified way to a doublet lens, referenced 341, and a lens referenced 342) and at least two deflection mirrors (including one forehead-mounted mirror referenced 22 in FIG. 2 and 343 in FIG. 3) by which the light beam coming from said source can be sent to the eye that is on the side on which the image source is located. These two mirrors appear in FIG. 2 (22, 23d or 23g). In FIG. 3, for a clearer understanding of the invention, the architecture is shown in an <<unfolded>> state, namely without taking account of the deflection mirror referenced 23g or 23d in the representation of FIG. 2. It is therefore shown in the plane $\pi$ containing the ocular axis $\Delta_{oc}$ and the vector $n_{oc}$ normal to the surface of the visor at the point of intersection of the ocular axis with the visor. This plane $\pi$ must also be a plane of symmetry of the set of image-forming means of the "unfolded" optical relay to accurately correct the aberrations linked to the off-axis use of the visor. Consequently, the mirrors 23d and 23g of FIG. 2, which cannot present the plane $\pi$ as the plane of symmetry, are necessarily plane mirrors.

On the contrary, a third deflection mirror, referenced 344, is provided, and is used especially to fold back the optical architecture along the helmet. In the example of FIG. 3, only one optical relay is shown. It corresponds to the projection on an eye. In practice, in the case of binocular vision, the optical architecture comprises two optical relays each corresponding to the projection of one or more image sources on an eye, the forehead-mounted mirror being common to the two optical relays.

The image source is, for example, an image coming from a sensor, for example the rear face of a standard light intensifier coupled to the image-taking lens (not shown). Other image sources may be used such as, for example, a source delivering flight information sent, for example, by a cathode-ray tube (CRT), a liquid crystal screen etc. Such a source may be used alone or preferably coupled to an image from a sensor. In the case of an image coming from a sensor, the optical architecture used should enable the image to be projected to the eye on the side on which the sensor is located. As explained here above, in case of the use of a one-piece visor, this entails the deflection of the optical path and hence a lengthening of this optical path. The optical architecture according to the invention resolves the difficulties of technical construction caused by these numerous instances of deflection in the case of a wide-field visor.

Thus, according to the invention, the single-piece visor 31 is formed by a non-plane surface generated by revolution of which an axis of revolution, referenced $\Delta$ in FIG. 3, is substantially parallel to the ocular axis $\Delta_{oc}$ and substantially contained in the sagittal plane of the pilot, at the level of his forehead. Furthermore, the forehead-mounted mirror of the optical architecture according to the invention is chosen to be not plane, substantially centered with respect to the pilot's sagittal plane, having an axis of revolution that is the same as the axis $\Delta$ of revolution of the visor. The geometrical parameters of the mirror are computed, according to the invention, so that the envelope of the useful beams (not shut out by the pupil) that get propagated between said forehead-mounted mirror and the first image-forming means 341 of the optical relay upstream from the forehead-mounted mirror are substantially contained in a cylinder with a section substantially equal to the useful surface of said mirror. The term "useful surface" refers to the surface illuminated by the means that get propagated between the source and the eye. Through this architecture, the dimensions of the envelope of the useful beams, of which the two beams on the edges of the field and the center beams are shown in FIG. 3, can be limited to dimensions compatible with the acceptable amount of space occupied by the optical relay. This acceptable space requirement is defined especially by the size of the first beam-forming means 341.

The present applicant has shown that a particularly useful embodiment of the forehead-mounted mirror consists of a mirror formed by two diopters at least one of which has a non-plane surface generated by revolution, the internal diopter being reflective, in other words a lens with a reflective face. More particularly, a very high optimization of the envelope of the useful beams between the forehead-mounted mirror and the first beam-formation means 341 is obtained, as can be seen in FIG. 3, with diopters whose surfaces generated by revolution are convex, aspherical, and have an axis of revolution that is the same as with the axis $\Delta$ of revolution of the visor.

Advantageously, the visor is formed by a surface generated by revolution, chosen to be aspherical, with an axis $\Delta$, the choice of the geometrical parameters being used also to contribute to keeping the envelope of the useful beams within the desired volume.

In a preferred solution of the invention, the optical relay 34 has at least three deflection mirrors, one of said mirrors, the mirror referenced 344 in FIG. 3, being positioned upstream from the first image-formation means 341, its plane $\pi$ being also a plane of symmetry, further enabling the correction of at least one part of the aberrations introduced by the forehead-mounted mirror 343. Indeed, the function of the forehead-mounted mirror according to the invention is essentially photometric, enabling the reduction of the envelope of the useful beams. However, the forehead-mounted mirror according to the invention does not contribute to image quality. Advantageously, the aberration-correcting mirror 344 is also a lens type mirror with a reflective face, formed by two diopters. One of the diopters is an internal reflective diopter and at least one of the two diopters has a non-plane surface generated by revolution. The present Applicant has thus shown that, with a forehead-mounted mirror of the type shown in FIG. 3, a correction mirror 344 having two diopters with aspherical surfaces generated by revolution, can compensate well for geometrical and chromatic aberrations as well as for distortion induced by the forehead-mounted mirror 343.

Figure 4A:
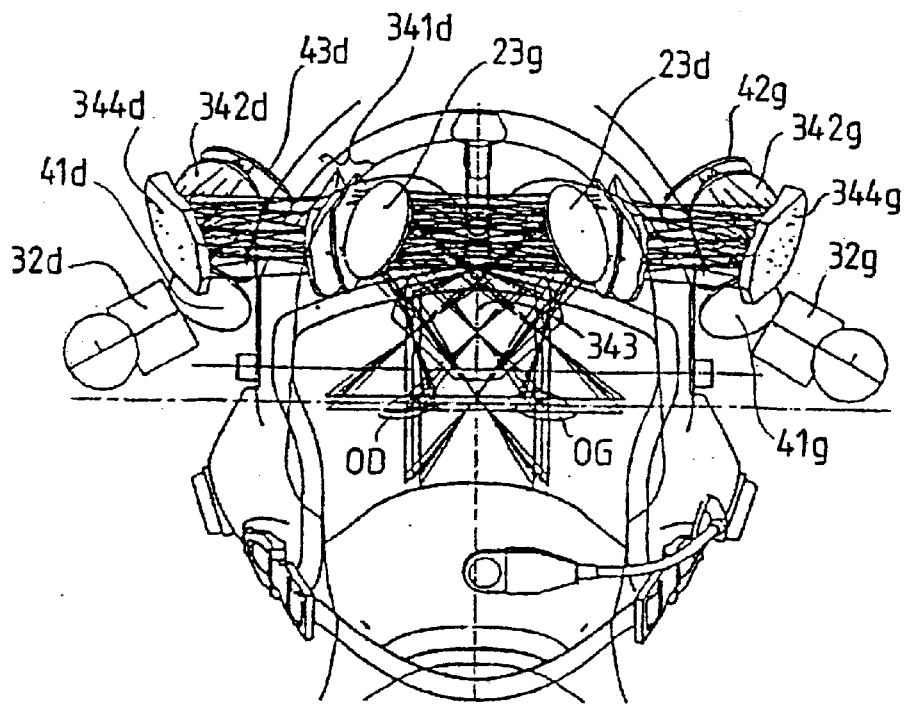
FIGS. 4A et 4B are front and profile views of the helmet visor with an optical architecture of the type described in FIG. 3
Figure 4B:
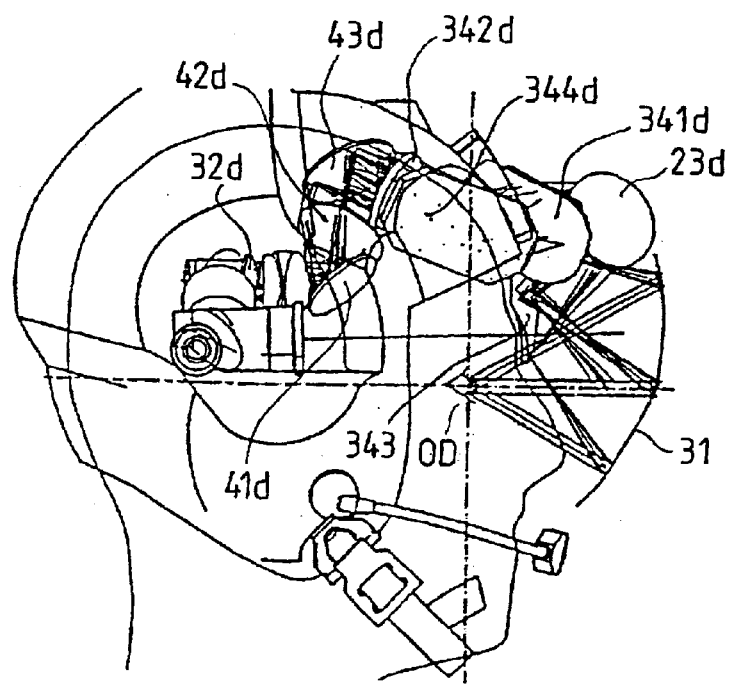

By way of an example, FIGS. 4A and 4B show the layout of an optical architecture of the type described in FIG. 3 on a helmet, according to front and profile views respectively. This is a binocular display comprising one channel for the left OG and one channel for the right eye OD, the optical elements of the different channels being indexed respectively by the letter "g" for the left eye and "d" for the right eye. The optical architecture illustrated in this example thus comprises an image source (32g and 32d) for each eye. This image source is formed in this example by a light intensifier coupled to an imaging objective. The image is formed by the given light intensifier are projected toward the eye on the side at which said intensifier is positioned. The optical architecture of the helmet-mounted display also has a one-piece visor 31 and two optical relays each associated with one eye, the two optical relays being identical in this example for each of the channels. A description is given for example of the channel of the right eye which is shown in FIGS. 4A and 4B. The images are therefore sent by the image source 32d. Then the optical relay, used to convey the images sent between the source 32d and the visor 31, comprises a set of deflection mirrors (41d, 43d, 344d, 23d and the forehead-mounted mirror 343) as well as image-forming means (especially the elements 42d, 342d and the doublet 341d which constitutes the first image-forming means upstream from the forehead-mounted mirror 343). In particular, in this exemplary embodiment of the optical architecture according to the invention, the forehead-mounted mirror is formed by a mirror with two convex diopters, the surfaces of which are generated by revolution and are aspherical, with an axis of revolution that is the same as the axis of revolution of the visor 31 whose surface is itself aspherical. Through this structure, the envelope of the useful beams that gets propagated between the forehead-mounted mirror and the doublet 341d is substantially contained in a cylinder with a section substantially equal to the useful surface of the forehead-mounted mirror, thus restricting the size of the doublet 341d (typically, its diameter must remain below 60 mm) and limit the space requirements of the optical relay to acceptable dimensions, even for a wide-field display, typically a field in the range of 60°. In this example, as in the example of FIG. 3, the deflection mirror 344d is also a lens type mirror with a reflective surface whose diopters have non-plane surfaces generated by revolution to reduce the geometrical and chromatic aberrations introduced by the forehead-mounted mirror.

Thus, the applicant has shown that it is possible, through the optical architecture of the invention, advantageous but non-restrictive examples of which have been described here above, to propose a wide-field helmet-mounted display with single-piece visor having in addition a level of compactness that is acceptable for operational use and having high image quality.

What is claimed is:

1. A compact optical architecture for a wide-field helmet-mounted display comprising:
    at least one image source with a given field,
    a single-piece visor enabling projection to infinity of an image before an eye of a pilot wearing the helmet,
    at least one optical relay to convey said image between the image source and the visor, the optical relay comprising image-formation means and at least two deflection mirrors, including one forehead-mounted mirror having a given surface area, wherein:
    said visor is formed by a surface generated by revolution, of which an axis of revolution is substantially parallel to an ocular axis and substantially contained in a sagittal plane of the pilot, at a forehead level,
    the forehead-mounted mirror is not planar and has an axis of revolution that is identical to said axis of revolution of the visor, its geometrical parameters being computed such that an envelope of useful beams propagated between said forehead-mounted mirror and the a first beam-formation means of the optical relay upstream from the forehead-mounted mirror are substantially contained in a cylinder with a section substantially equal to a useful surface of said mirror.

2. An optical architecture according to claim 1, wherein said forehead-mounted mirror is a mirror formed by an internal lens and an external lens, at least one of which has a non-planar surface generated by revolution, the internal lens being reflective.

3. An optical architecture according to claim 2, wherein the surfaces of the internal lens and external lens forming the forehead-mounted mirror are aspherical, convex surfaces generated by revolution, the axis of revolution being identical to said axis of revolution of the visor.

4. An optical architecture according to claim 1, wherein the visor is formed by an aspherical surface generated by revolution.

5. An optical architecture according to claim 1, wherein the optical relay comprises at least three deflection mirrors, one of said mirrors being positioned upstream from said first image-forming means, thereby enabling the correction of at least one part of the aberrations introduced by said forehead-mounted mirror.

6. An optical architecture according to claim 5, wherein said deflecting mirror includes a mirror formed by two lenses, including an internal reflective lens, at least one of the two lenses having a non-planar surface generated by revolution.

7. An optical architecture according to claim 6, wherein the surfaces of the two lenses forming said deflection mirror are non-planar surfaces generated by revolution.

8. An-optical architecture according to claim 1, wherein the image source includes an emitter face of a light intensifier tube optically coupled to an imaging objective.

9. An optical architecture according to claim 1, comprising at least two image sources positioned on either side of the helmet and two optical relays, each associated with an eye of the pilot, each optical relay ensuring the conveyance of the images sent by said image source or images to an eye of the pilot, said forehead-mounted mirror being common to the two optical relays.

* * * * *